United States Patent
Foch

[15] 3,649,845
[45] Mar. 14, 1972

[54] GENERATION OF PHASE-DISPLACED TRIANGULAR SIGNALS WHICH MAY BE TWO-PHASE AND THREE-PHASE, AND OF CORRESPONDING SINUSOIDAL SIGNALS

[72] Inventor: Henri Foch, Toulouse, France
[73] Assignee: Agence Nationale de Valorisation de la Recherche Anvar
[22] Filed: Aug. 12, 1970
[21] Appl. No.: 63,156

[30] Foreign Application Priority Data
Aug. 14, 1969 France..................................69/28.017

[52] U.S. Cl...............................307/228, 235/197, 328/14, 328/157, 328/181
[51] Int. Cl. ..........................................................H03k 4/08
[58] Field of Search.............235/190, 197; 307/228; 328/14, 328/156, 157, 181, 185

[56] References Cited

UNITED STATES PATENTS

| | | | |
|---|---|---|---|
| 3,100,839 | 8/1963 | Nathan et al. | 235/197 |
| 3,120,605 | 2/1964 | Nathan et al. | 235/197 |
| 3,255,363 | 6/1966 | Stella | 328/157 X |
| 3,278,765 | 10/1966 | Mudie | 307/228 X |
| 3,441,727 | 4/1969 | Vieth, Jr. | 307/228 X |
| 3,443,081 | 5/1969 | Nathan | 235/197 |
| 3,443,463 | 5/1969 | Campbell | 328/14 |

Primary Examiner—Donald D. Forrer
Assistant Examiner—R. C. Woodbridge
Attorney—Michael P. Breston

[57] ABSTRACT

In order to generate a phase-displaced triangular signal or a plurality of such signals, the invention utilizes as a base a single triangular signal and, by various purely additive combinations of this signal and of its inverse with continuous voltages, generates the desired signal or signals by simple logical switching operations. The signal obtained is, simultaneously in frequency and amplitude, in a simple numerical ratio (1, 2 or 3) with the frequency and amplitude of the basic signal, and for this reason there cannot occur either drift or variation either of frequency or amplitude, which constitutes an outstanding advantage of the invention.

2 Claims, 10 Drawing Figures

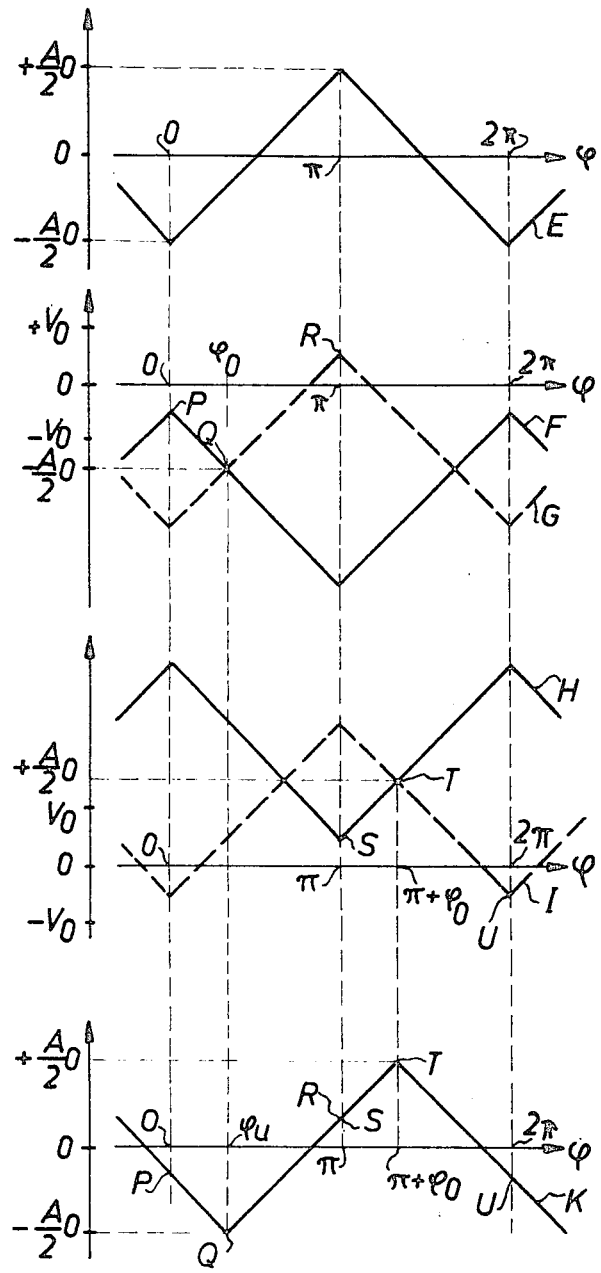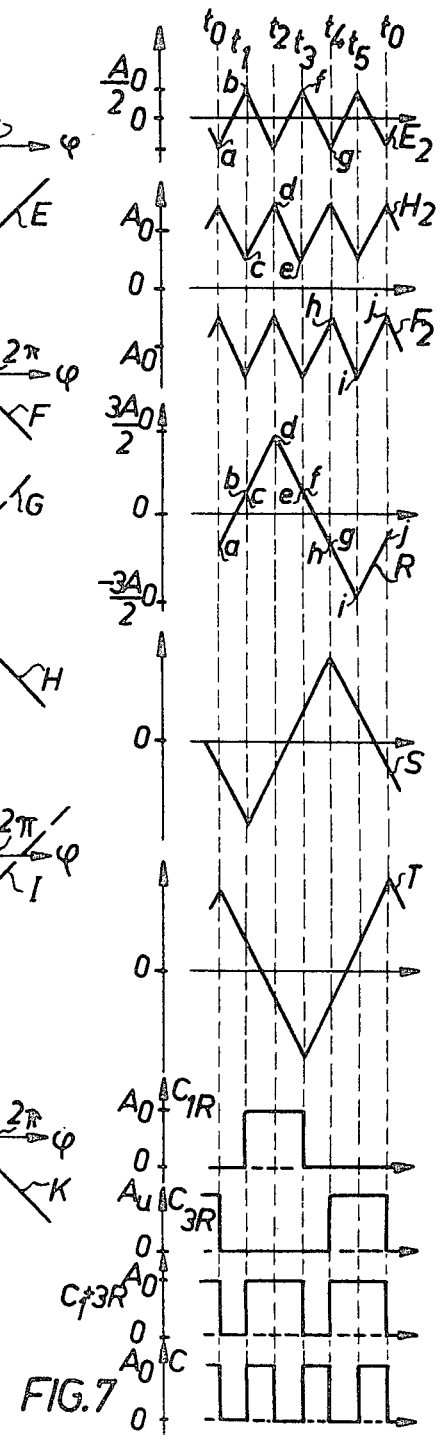
FIG.1
FIG.7

Henri Foch
INVENTOR

BY Michael P. Breston
ATTORNEY

GENERATION OF PHASE-DISPLACED TRIANGULAR SIGNALS WHICH MAY BE TWO-PHASE AND THREE-PHASE, AND OF CORRESPONDING SINUSOIDAL SIGNALS

The invention relates to the generation of phase-displaced triangular signals and of the corresponding sinusoidal signals, these signals being capable of being phase-displaced by $\pi/2$, that is to say two-phase, or by $2\pi/3$ and $4\pi/3$, that is to say three-phase.

It will be noted that by a triangular signal there is meant a symmetrical signal, the waveform of which is composed of straight portions having alternately the same positive slope and the same slope in absolute value, but negative.

For the generation of such phase-displaced signals, it has already been proposed to juxtapose a plurality of synchronized single-phase oscillators or to inject the output of a single oscillator into a plurality of phase-shifting R-C networks. These systems are difficult to regulate in frequency and in phase, which vary with the load, and by their very principle give signals of amplitude which varies with the phase-shift.

The invention has for its object to eliminate these defects.

In order to generate a phase-displaced triangular signal or a plurality of such signals, the invention utilizes as a base a single triangular signal and, by various purely additive combinations of this signal or of its inverse with continuous voltages, generates the desired signal or signals by simple logical switching operations. The signal obtained is, simultaneously in frequency and amplitude in a simple numerical ratio (1, 2 or 3, as will be seen) with the frequency and amplitude of the basic signal, and for this reason there cannot occur either drift or variation either of frequency or amplitude, which constitutes an outstanding advantage of the invention.

Succinctly, in order to generate a triangular signal phase-displaced by an angle $\phi°$ of frequency $f$ and a peak-to-peak amplitude $Ao$, the invention employs a triangular signal E having the said frequency $f$ and the said amplitude $Ao$, a continuous voltage $Ao$ equal to the said amplitude, and a continuous voltage $Vo$ defined by : $V0=Ao\phi°/\pi$ and the invention generates the signal phase-displaced by $\phi°$ by taking in the interval $0 \leq \varphi \leq \pi$ of the signal E the larger in algebraic value of the two signals $(-Vo+E)$ and $(-A+Vo-E)$ and in the interval $\pi \leq \varphi \leq 2\pi$ of the signal E, the smaller in algebraic value of the two signals $(Vo+E)$ and $(+A-Vo-E)$.

As will be described later, the same method makes it possible to obtain a triangular signal phase-displaced by $-\phi°$, and similar methods permit the production of two-phase and three-phase signals, furthermore with simpler unit structures. In all cases, it is possible to pass, in a manner conventional per se, from phase-displaced triangular signals to phase-displaced sinusoidal signals.

The invention and embodiments of the invention will now be described with reference to the accompanying drawings given by way of nonlimitative examples, In these drawings :

FIG. 1 is a graph illustrating the transition according to the invention from a triangular signal to a triangular signal of the same frequency and amplitude, phase-displaced by $\phi°$;

FIG. 7 is a graph similar to FIGS. 4 and 5, showing the generation of three-phase signals in accordance with the invention ;

Figure 2:
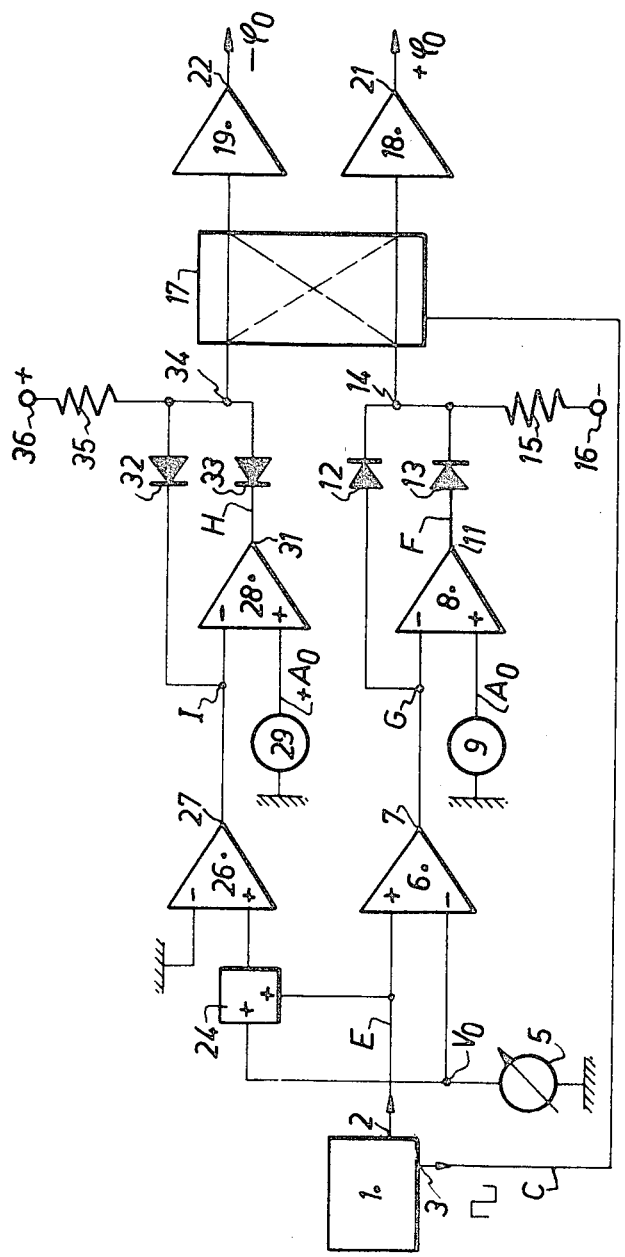
FIG. 2 is a block diagram of an application of the invention according to FIG. 1 to the generation of two signals, one phase-displaced by $+\phi°$ and the other by $-\phi°$.

The principle of the invention will be explained with reference to FIG. 1 which, as explained below, corresponds to the production of a phase-shift $\phi°=\pi/3$ taken by way of nonlimitative example. The abscissae are in $\phi=wt$ proportional to the time $t$, and the ordinates are voltages. In the top graph is shown the basic triangular signal having a peak-to-peak amplitude Ao, governed by the equations :

(1)   $E=-A0/2+Ao\phi/\pi$ For $0 \leq \varphi \leq \pi$
      $E=(3A0/2)-Ao\phi/\pi$ For $\pi \leq \varphi \leq 2\pi$ In the graph below that above, two signals drawn from the signal E are shown : the signal F (represented in full line) is :
(2)   $F=Ao+Vo\ E$ in which $Vo$ is a constant voltage as is also $Ao$. It will be noted that F is the algebraic sum of three signals, which is an operation easy to effect by logical circuits. We have therefore :
(3)   $F=-Ao/2+Vo-Ao\phi/\pi$ For $0 \leq \varphi \leq \pi$ The signal G (shown in broken lines) is : 4. $G=-Vo+E$
and therefore : 5 $G=-Ao/2-Vo+Ao\phi/\pi$ For $0 \leq \varphi \leq \pi$ The graphs of the two signals F and G intersect at a point Q, for which F=G, therefore :
$-Ao/2+Vo-Ao\phi°/\pi=-Ao/2-Vo+Ao\phi°/\pi$
from which 6. $\phi°=(\pi vo)/Ao$ The abscissa of Q is thus $\phi°$ and its ordinate is $-Ao/2$.

Of the signal F the portion PQ is retained, in which $0 \leq \varphi \leq \varphi_o$ while of the signal G the portion QR is retained, in which $\overline{\varphi_o} \leq \varphi \leq \tau$. This choice could be made as a function of $\phi$, but it is simpler to select by retaining, in the interval $0 \leq \varphi \leq \pi$ that of the two signals F and G which is the greater algebraically, this operation being easy to carry out with logical circuits.

Similarly, from the signal E there are drawn two signals H and I with the same value of $Vo$ : 7. $H=Ao-Vo-E$ 8. $I=Vo+E$ which intersect at a point T having the abscissa $(\pi+\phi°)$ and the ordinate $+Ao/2$, and there is retained in the interval $\pi \leq \varphi \leq 2\pi$ that of the two signals H and I which is the smaller algebraically, that is to say the portions ST and TU.

Finally, in the bottom graph, there is obtained the signal P, Q, R $\equiv$ S, T, U, which is a triangular signal K identical with the basic signal E but phase-displaced by $\phi°$.

It will be noted that the peak-to-peak amplitude of the signal K is equal to the peak-to-peak amplitude $Ao$ of the basic signal E. There is thus no possibility of variation of the amplitude obtained, which constitutes an essential advantage of the invention. It will further be observed that the signal K is obtained by means of the algebraic sums of signals and then from a choice between signals, which are simple logical operations which do not deform the signals. It will finally be noted that any desired phase-shift $\phi°$ can be obtained by simply choosing : 9. $Vo=Ao\phi°/\pi$
which is an easy and certain method.

It will be noted that, due to the symmetric of each of the drafts of the center of FIG. 1 with respect to the abscissa $\pi$, in order to obtain a phase-shift of $-\phi°$, it is only necessary to retain symmetrically in the interval $(0, \pi)$ the smaller of the two signals H and I and in the interval $(\pi, 2\pi)$ the greater of the two signals F and G.

There will now be described with reference to FIG. 2, an application of the invention permitting the generation from a triangular signal of two triangular signals of the same amplitude and the same frequency, one phase-displaced by $+\phi°$ and the other by $-\phi°$. The oscillator 1 provides at its output 2 the triangular signal E having a peak-to-peak amplitude $Ao$, and on its output 3 a rectangular signal C in phase and having the same frequency (for example positive for $0<\phi<\pi$ and negative for $\pi<\phi<2\pi$. An adjustable biasing element 5 provides the voltage $Vo=Ao\phi°/\pi$. The signal E is applied to the positive input of an operational amplifier 6, the negative input of which receives the voltage $Vo$ ; its output 7 thus provides the signal G in accordance with equation (4).

The signal G is applied to the negative input of an operational amplifier 8, the positive input of which receives a negative biasing voltage A0 supplied by an element 9. Its output 11 thus provides the signal F in accordance with equation (3). The signals G and F are applied to the anodes of two diodes 12 and 13, the cathodes of which are connected together at 14 and through a high resistance 15 to a source of negative voltage 16. At the point 14 there is thus found the greater of the two signals F and G.

On the other hand, the said signals E and V0 are added together in an adding device 24 supplying the positive input of an operational amplifier 26, the negative input of which is connected to earth. There is thus found at its output 27 the signal I following equation (8). This signal I is applied to the negative input of an operational amplifier 28, the positive input of which receives a positive biasing voltage Ao supplied by an element 29. There is thus found at its output 31 the signal H according to equation (7).

The signals H and I are applied to the cathodes of two diodes 32 and 33, the anodes of which are connected together at 34 and through a high resistance 35 to a source of positive voltage 36. There is thus obtained at the point 34 the smaller of the two signals H and I. The signals at the points 14 and 34 are transmitted by a solid double-reversing device 17 controlled by the said signal C, either directly (full line, interval $0 \leq \varphi \leq \pi$) or by crossing (broken line, interval $\pi \leq \varphi \leq 2\pi$), to two operational amplifiers 18 and 19, at the outputs 21 and 22 of which there is found the signal K, (phase-displaced by $+\phi°$ with respect to E) and its hologue (phase-displaced by $-\phi°$ with respect to E).

The outputs 21 and 22 ant the output 2 of the oscillator 1 may each deliver into a sinusoidal wave-forming circuit (limiter circuit, resonant circuit, etc.) of conventional type. In this case however, the invention fulfils the need for obtaining sinusoidal waves phase displaced by any desired angle, in an adjustable manner while however retaining a constant amplitude.

It will of course be understood that the invention is not limited to the members described and shown, which may be replaced by equivalent means. For example, an operational amplifier may be replaced by an adding or subtracting device, the biasing elements at $-Ao$ and $+A0$ can be replaced by peak circuits receiving the voltage E, the solid reversing device may be replaced by four gates, as will be obvious to those skilled in the art.

It has been stated that the invention is applicable to any desired value of the phase-shift $\phi°$. It is applicable in particular to $\phi°=\pi/2$ (two-phase or tetra-phase wave) and to $\phi°=2\pi/3$ (three-phase waves). However, if the choice is limited to one of these two values of the phase-shift, the invention can be substantially simplified in its application. This will be justified by referring to FIG. 3, which concerns the phase-shift $\phi°=\pi/2$. There are again found the four signals F, G, H, I, but of course for $V0=Ao/2$ in accordance with equation (9).

Figure 3:
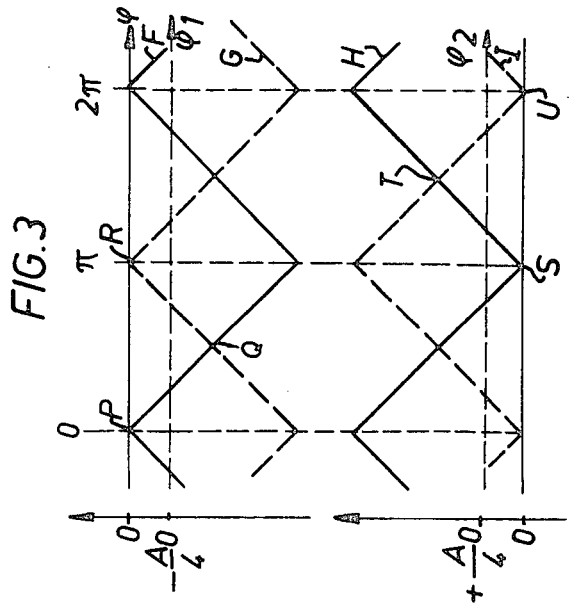
FIG. 3 is a graph similar to that of FIG. 1 but drawn for the special case in which $\phi°=\pi/2$ in order to show the transition to two-phase signals.

It is clear from FIG. 3 that PQR is a triangular signal of double frequency and peak-to-peak amplitude $Ao/2$ with respect to the axis $0\phi_1$, having the ordinate $-Ao/4$. Similarly, STU is a triangular signal of double frequency and a peak-to-peak amplitude $Ao/2$ with respect to the axis $0\phi_2$ having the ordinate $+Ao/4$. o/

The principle of the invention is then simplified in this particular case, starting from these two triangular signals at double frequency (which are in phase-opposition); in order to obtain two signals displaced by $\pi/2$, which corresponds to the said phase opposition at double frequency.

Figure 4:
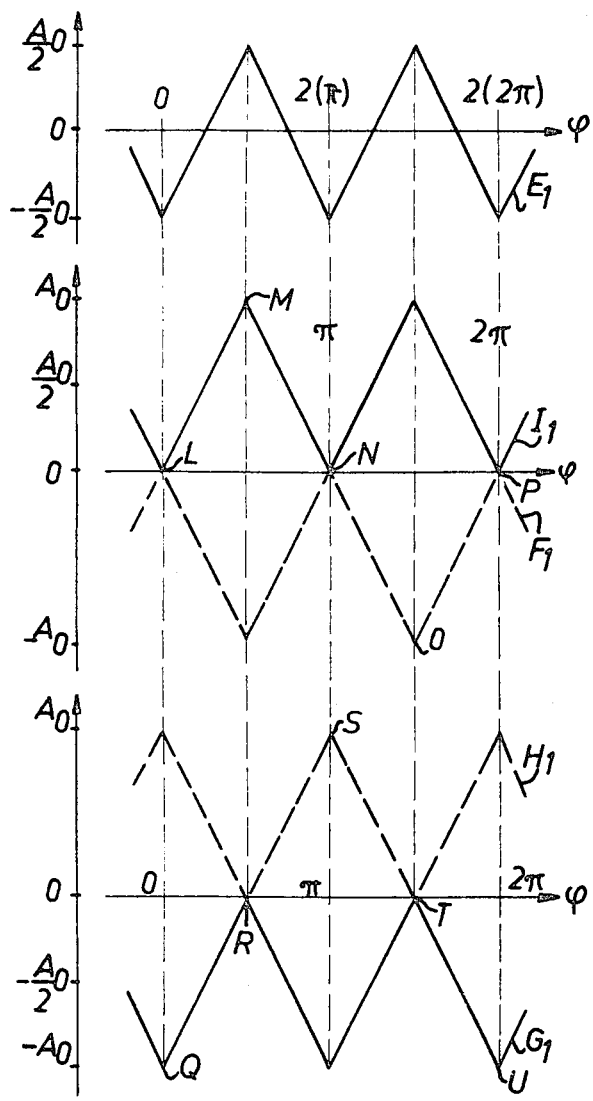
FIG. 4 is a graph similar to FIG. 1, showing the generation of a two-phase signal in accordance with the invention.

In more detail with reference to FIG. 4, from the triangular signal E1 of frequency $2f$ and peak-to-peak amplitude $Ao$, there are again formed in this case by simple algebraic additions, the signals: $I_1=Ao/2+E_1$ $F_1=-Ao/2-_1$ $H_1=Ao/2-E_1$ $G_1=-Ao/2+_1$ and there is obtained the first triangular signal with a frequency $f$, by taking for $0 \leq \varphi \leq \pi$ the signal $I_1$ (portions LMN) and for $\pi \leq \varphi \leq 2\pi$ the signal F1 (portions NOP). Similarly, the second triangular signal is obtained, phase-displaced by $\pi/2$ with respect to that preceding, by taking for $0 \leq \varphi \leq \pi/2$ the signal G1 (portion QR), for $\pi/2 \leq \varphi \leq 3\pi/2$ the signal H1 (portions RST), and for $3\pi/2 \leq \varphi \leq 2\pi$ the signal G1 (portion TU). The two signals obtained have a frequency $f$ and a peak-to-peak amplitude of 2 Ao. It will be noted that in this case also the amplitude of the signals obtained is invariable and is not liable to drift with respect to the amplitude of the basic signal.

Figure 5:
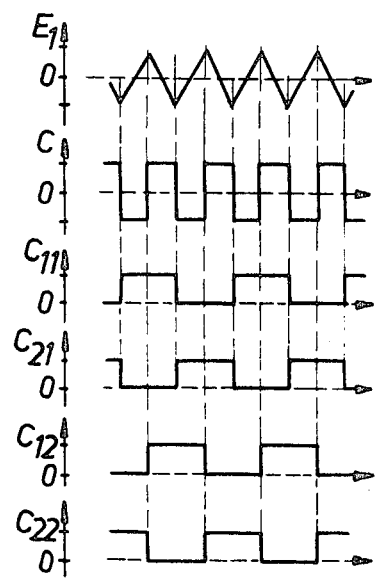
FIG. 5 is a graph of the switching signals suitable for the generation of a two-phase signal in accordance with FIG. 4.

The switching signals C, necessary for producing the phase-displaced signals described above, are shown in FIG. 5. The production of such signals from the signal E1 is conventional and will therefore not be described.

Figure 6:
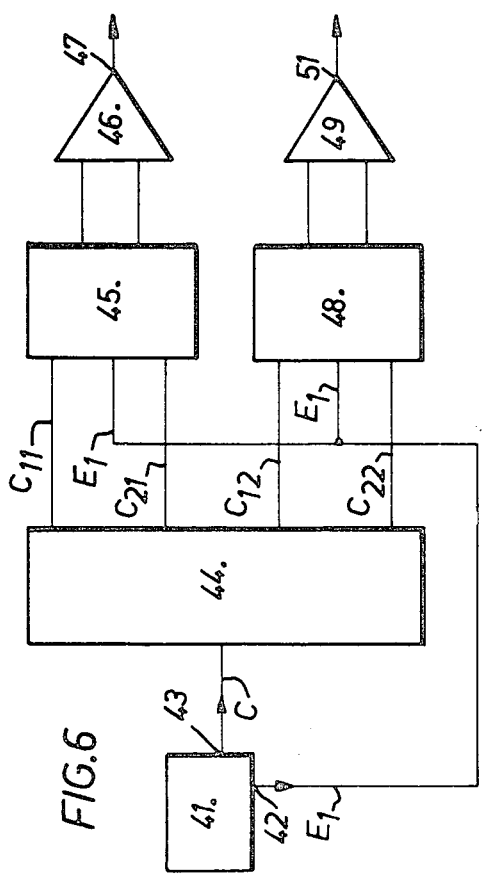
FIG. 6 is a block diagram of an application of the invention according to FIGS. 4 and 5, to the generation of a two-phase signal.

There will now be described with reference to FIG. 6 such an application of the invention to the production of triangular two-phase signals $\pi/2$. The oscillator 41 supplies at its output 42 the triangular signal E1 and at its output 43 the rectangular signal C which is applied to a ring counter 44, comprising for example two bistable trigger devices (not shown), supplying at its outputs the switching signals $C_{11}, C_{12}, C_{21}, C_{22}$.

The switching signals $C_{11}$ and $C_{21}$ are applied to a solid reversing device 45 which they operate, and which receives the triangular signal E1; the reversing device 45 actuates an operational amplifier 46, at the output 47 of which is found the first triangular signal (at LMNOP of FIG. 4). Similarly, the signals $C_{12}$ and $C_{22}$, and also the signal E1 are applied to a solid reversing device 48 feeding an operational amplifier 49, on the output 51 of which is found the second triangular signal phase-displaced by $\pi/2$ (outline QRSTU of FIG. 4).

In this case also the triangular signals obtained can each be fed into a circuit of conventional type acting as a sinusoidal wave shaper. The invention thus permits two-phase or tetra-phase sinusoidal voltages to be obtained.

There will now be described the other case of simplification according to the invention which concerns three-phase waves, that is to say three signals phase-displaced in pairs by $2\pi/3$, with reference to FIG. 7. From top to bottom there can be seen the basic signal E2 of frequency $3f$ and peak-to-peak amplitude Ao. There are again formed in this case, by simple algebraic additions, the signals:

$$H_2=Ao-E_2 \text{ and } F_2=-Ao-E_2$$

and there is obtained the signal of phase R by taking from $t_o$ to $t_1$ the signal E2 (portion ab), from $t_1$ to $t_3$, the signal H2 (portions cd and de), from $t_3$ to $t_4$ the signal E2 (portion fg) and from $t_4$ to $t_o$ the signal $f2$ (portions hi and ij).

This signal R is actually a triangular signal of frequency $f$ and peak-to-peak amplitude 3A0. It is clear that the two other signals S and T are obtained by taking portions displaced by one and two periods, of the signals E2, H2 and F2. The necessary switching signals are shown at the bottom of FIG. 7.

Figure 8:
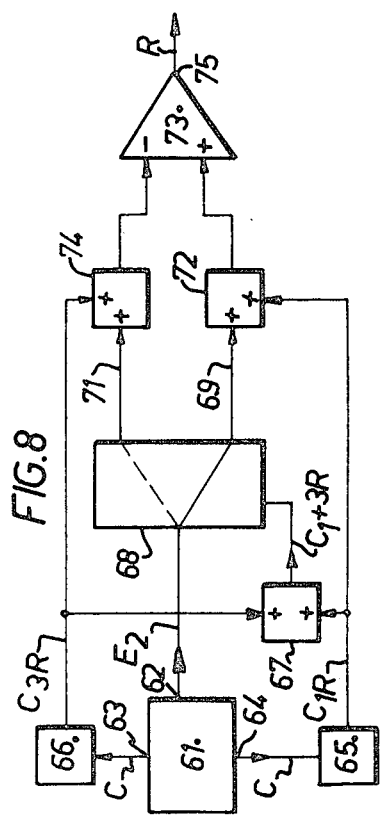
FIG. 8 is a basic diagram concerning a single-phase R of the generation of three-phase signals according to FIG. 7.

FIG. 8 shows the basic diagram embodying the corresponding structure for the phase R for example.

The triangular signal generator 61 supplies at its output 62 the triangular signal E2, and at its outputs 63 and 64 the switching signal C. Two logical circuits 65 and 66 receive the signal C and supply the switching signals $C_{1R}$ and $C_{3R}$, from which an adding device 67 supplies the switching signal $C_1+_{3R}$. A solid reversing device 68, controlled by the switching signal $C_1+_{3R}$ sends the signal E2 to one or the other of two channels 69 and 71. An adding device 72 forms the sum of the signal E2 and the signal $C_{1R}$ and sends it to the positive input of an operational amplifier 73, the negative input of which receives the sum of the signal E2 and the signal $C_{3R}$ and supplied by an adding device 74, and at the output 75 of the operational amplifier there is obtained the triangular signal of the phase R.

Figure 9:
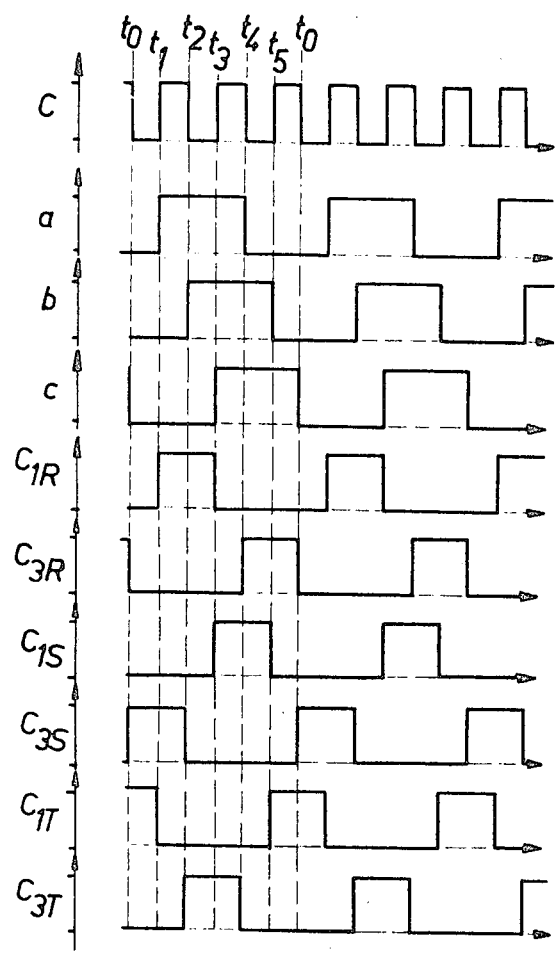
FIG. 9 is a graph of the switching signals of an application of the invention to the generation of three-phase signals.
Figure 10:
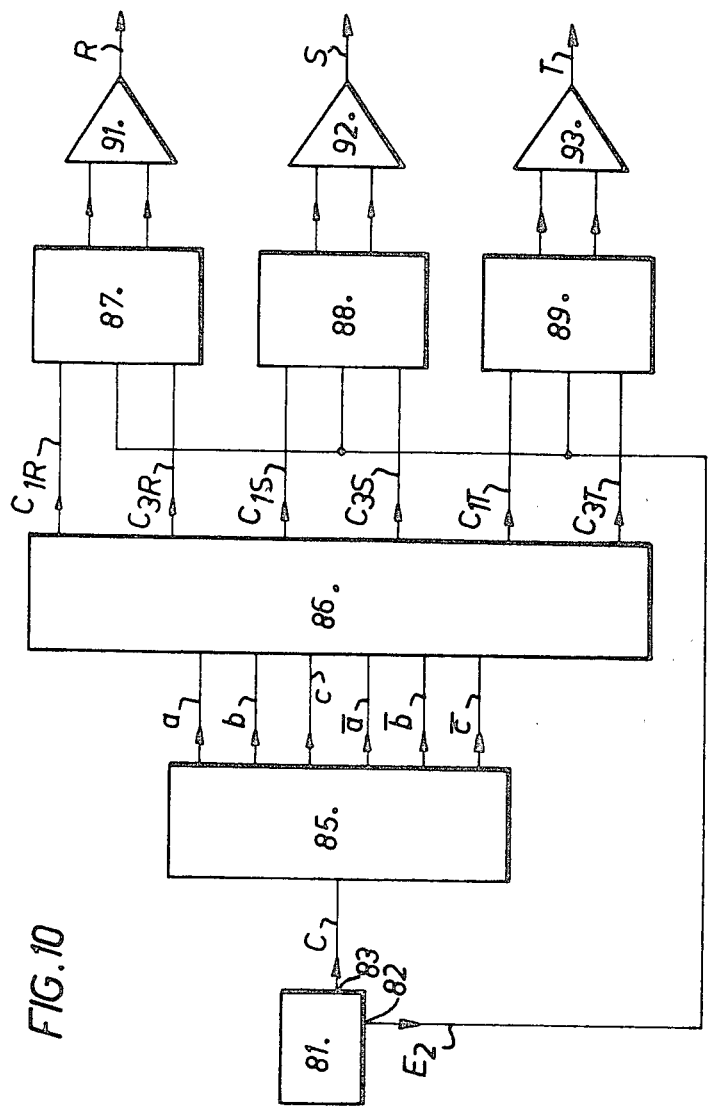
FIG. 10 is a block diagram of an application of the invention according to FIGS. 7 and 9, to the generation of three-phase signals.

As will be described later, it is possible to use a ring counter. With reference to FIG. 9, the ring counter supplies, from the switching signal C supplied to it by the triangular signal generator, signals $a$, $b$, $c$ which are combined by conventional logical circuits in:

for the phase R: $a.\overline{c}=C_{1R}$ and $\overline{c}.\overline{a}=C_{3R}$
for the phase S: $b.\overline{c}=C_{1S}$ and $\overline{b}.\overline{c}=C_{3S}$
for the phase T: $\overline{a}.\overline{b}=C_{1T}$ and $a.b=C_{3T}$ With reference to FIG. 10, the triangular signal generator supplies at its output 82 the triangular signal E2, and at its output 83 the switching signal C, applied to a ring counter 85 supplying at six outputs the signals $a$, $b$, $c$ and $\bar{a}$, $\bar{b}$, $\bar{c}$ which are combined in a unit 86 of logical gates supplying the switching signals $C_{1R}$, $C_{3R}$, $C_{1S}$, $C_{3S}$, $C_{1T}$, $C_{3T}$, which control three solid reversing devices 87, 88, 89 which furthermore receive the triangular signal E2 of the generator 81. These reversing devices supply three operational amplifiers 91, 92, 93, at the output of which are found the triangular signals R, S, T.

In this case also, the three-phase triangular signals obtained can each be applied to a conventional sinusoidal wave-shaping circuit. The invention thus makes it possible to obtain three-phase sinusoidal voltages.

The advantage of the system which has just been described results from several factors, and first of all from the actual principle of operation of the three-phases of the three-phase system by simple cutting out or justaposition of elements obtained from a single triangular monophase signal.

The control of this cutting out or this justaposition is effected by a logical unit which ensures very good precision in the preparation of the signals. The phase displacements obtained between the three output phases thus have a stability which results solely from the frequency stability of the single-phase oscillator employed.

The analogue treatment of each signal is ensured by a single amplifier, and it is therefore possible to give the output signals R, S, T a quality which is comparable with that of the input signal $e$. In fact, the static reversing devices such as 87, 88, 89 have practically no effect on the quality of the analogue signal which they transmit. As regards the logical units 85, 86, their only effect is due to their response times, which are totally neglegible at the working frequencies.

The frequency range of the device proposed obviously depends on the quality of the single-phase oscillator. It should be noted that due to the actual principle of the device, the lowest possible frequency of the three-phase system is one-third of that of the single-phase system.

The upper limit of frequency is governed by the relative magnitude of the response time of the logical units 85, 86 with respect to the corresponding period of the oscillator. This limit is situated at several multiples of ten kilohertz with a judicious choice of the logical elements.

There should be noted as an additional advantage of the device, the fact that all the operations affected on the signal are conventional and can be effected by means of integrated circuits. The utilization of a device of this kind does not therefore necessitate the use of any special circuit, and thus avoids the majority of the operations of adjustment and calibration which are generally in systems of this kind.

A further advantage of the device described above is associated with the choice of the single-phase oscillator 81.

Amongst the various types of conventional single-phase oscillators, the oscillator which delivers triangular signals is characterized by the possibility of piloting the oscillation frequency by an external continuous voltage. By this means it is possible, in the device according to the invention, to carry out a programming of the frequency of the three-phase system or alternatively a servocontrol of this same frequency by a quantity of any kind.

The performances of the device described depend on those of the single-phase oscillator 81. There will be indicated below a few values relating to an oscillator of this type :

Frequency stability as a function of variations of ±10 percent of the mains supply voltage : 0.5 percent;

level stability : 0.2 db. under the same conditions ;

Variation of the triangular voltage output as a function of the frequency : ±0.3 db. ;

Maximum difference of slope of the triangular signals : 2 percent.

It can be seen that the method of the invention and the devices for its utilization which have just been described permit the simple and accurate preparation of phase-displaced signals. In addition to their conventional applications, devices of this kind may be advantageous for example in the preparation of any functions which are phase-displaced or have a programmable or servo-controlled frequency.

It will of course be understood that the invention is not limited to the forms of embodiment described and shown, which have only been given by way of example.

What I claim is :

1. Generation of a triangular signal phase-displaced by an angle $\phi°$, of frequency $f$ and peak-to-peak amplitude $A_o$, employing a triangular signal E of frequency $f$ and amplitude $A_o$, a continuous voltage $A_o$ equal to said amplitude and a continuous voltage $V_o$ specified by :

$$V_o = A_o \phi°/\pi$$

and the desired phase-displaced signal being obtained by taking, during the rising slope or interval $0 \leq \varphi \leq \pi$ of the signal E, the larger in algebraic value of the two signals $(-V_o+E)$ and $(-A_o+V_o-E)$, and taking during the downward slope or interval $\pi \leq \varphi \leq 2\pi$ of the signal E, the smaller in algebraic value of the two signals $+V_o+E$ and $(+A_o-V_o-E)$.

2. Generation of a triangular signal phase-displaced by $\phi°$ and of a triangular signal phase-displaced by $-\phi°$ as claimed in claim 1, employing an oscillator supplying the said triangular signal E and the corresponding rectangular signal C, an adjustable polarizing element supplying the said voltage $V_o$, an operational amplifier receiving at its positive input the said signal E and on its negative input the said voltage $V_o$ and supplying at its output the signal $(-V_o+E)$, a second polarizing element supplying the said voltage $-A_o$, a second operational amplifier receiving at its positive input the said voltage $-A_o$ and on its negative input the signal $(-V_o+E)$ and supplying at the output the signal $(-A_o+V_o-E)$, a diode receiving on its anode the signal $(-V_o+E)$, a second diode receiving on its anode the signal $(-A_o+V_o-E)$, the cathodes of the two diodes being connected together and to one extremity of a resistance connected to a source of negative voltage, a summation device receiving on its input the signal E and on an input the signal $V_o$ and supplying at its output the signal $(+V_o+E)$, a third operational amplifier receiving on its positive input the signal $(+V_o+aE)$, connected to earth at its negative input and supplying at its output the signal $(V_o+E)$, a third polarizing element supplying the said voltage $A_o$, a fourth operational amplifier receiving on its positive input the said voltage $A_o$ and on its negative input the signal $(+V_o+E)$ and supplying at its output the signal $(+A_o-V_o-E)$, a third diode receiving on its cathode the signal $(+V_o+E)$, a fourth diode receiving on its cathode the signal $(+A_o-V_o-E)$, the anodes of the two diodes being connected together and to one extremity of a resistance coupled to a positive voltage, a solid double reversing device controlled by the said signal E and connected by inputs to the cathodes of the first and second diodes and to the anodes of the third and fourth diodes and two operational amplifiers, the input of each amplifier being connected to an output of the reversing device, the two triangular signals phase-displaced by $\phi°$ and $-\phi°$ being then obtained at the outputs of the said amplifiers.

* * * * *